Aug. 17, 1954

H. W. BAUMAN ET AL 2,686,846

MAGNETIC TRANSDUCER HEAD

Filed Jan. 16, 1952

INVENTORS.
Harold W. Bauman
& Wesley L. Eddy
BY [signature]
Attorneys

Patented Aug. 17, 1954

2,686,846

UNITED STATES PATENT OFFICE 2,686,846

MAGNETIC TRANSDUCER HEAD

Harold W. Bauman, Chicago, and Wesley L. Eddy, Downers Grove, Ill., assignors to Ampro Corporation, Chicago, Ill., a corporation of Illinois Application January 16, 1952, Serial No. 266,767

3 Claims. (Cl. 179—100.2)

This invention relates to magnetic transducer heads that are provided with dual transducing gaps respectively for cooperation with different record body track areas that pass the head with their longitudinal axis disposed in different parallel planes that extend across the respective gaps for registration of the respective track areas with the different gaps. A principal field of use of such a head is for recording or reproducing on or from the different ones of a pair of track areas provided by a common tape-form record body, and more specifically, the arrangement is such that while the record body is driven in one direction transducing cooperation is maintained only between one track area and one gap while in the other direction of record travel only the other track area and the other head gap cooperate.

In the present invention the respective gaps are provided by two different parallel branches of a magnetic circuit device having a single core structure that is linked with a single electrical winding assembly. The gaps respectively are provided by different ones of a pair of pole pieces, each of which has a polar face that is positioned in gap-defining relation to different pole-providing surface portions of a common magnetic circuit element that is linked with the electrical winding through the common core structure. The different gaps are so relatively positioned that the record body can be positioned for cooperation of a selected one of its tracks with the corresponding one of the gaps while the second track is maintained sufficiently spaced from both gaps to preclude any transducing effect between that second track and either one of the gaps.

Reference is made to the copending application for United States patent of Harold W. Bauman and Hugh A. Howell, Serial No. 266,767, filed January 16, 1952. That application discloses and claims a type of assembly that is useful in a variety of small, low power, electromagnetic inductance devices, in general, due to the exceptional electromagnetic efficiency of the electrical winding and magnetic circuit arrangement and the excellent magnetic characteristics provided by the magnetic circuit structure. The arrangement is particularly useful in magnetic transducer heads because of the practical means provided for definition of a transducing gap by very accurately finished and relatively positioned spaced surfaces of the magnetic structure. The application in question discloses and claims both single and multiple track transducer heads, and one specific form of the latter. In general, the basic arrangement comprises a tubular shell of magnetically permeable material, provided at one end with a transverse end wall that presents an edge surface. A magnetically permeable core piece is disposed inside the shell and has a lateral surface portion parallel to, overlying and spaced from a portion of the end wall edge surface, whereby the opposed lateral and edge surface portions of the core piece and shell wall define a nonmagnetic transducer gap and act as polar surfaces at its opposite ends. Inside the shell, the core piece is encircled by an electrical winding and beyond the winding from the gap the core piece is secured in close contact with the shell for magnetic circuit continuity. The face-to-edge relation of the pole piece and shell end wall surface portions defining the gap provides for an easily accomplished practically parallel relation between and registration of the gap-defining polar surfaces, and also permits their spacing at any suitable distance to obtain a transducing gap of a desired length. Additionally, the surface-to-edge relation provides a simple way to produce a gap having a desired depth of interface, the extent away from the record body path of the gap, since this gap dimension is fixed by the thickness of the wall providing the edge surface that defines one side of the gap.

In the preferred transducer head arrangement of the said application, the tubular shell is made of a pair of half shell sections assembled in matched relation, the end wall structure providing the gap-defining edge surface being an integral part of one of the shell sections, and therefore being accessible for finishing and polishing to an accurately flat, smooth condition. The attachment of the core piece to the shell preferably is by a second face-to-edge relationship between a rearward lateral surface portion of the pole piece and a rear end wall edge surface portion. These second surface portions are maintained in close contact for substantial continuity of the magnetic circuit.

In the dual track transducer head disclosed and claimed in the above-identified application, each of a pair of pole pieces is assembled with the shell in the indicated manner to provide a pair of transducer gaps that are suitably spaced for respective cooperation with different record body tracks. Each pole piece is encircled by an individual winding, and each winding may be separately energized to develop magnetic recording fields across the gap defined by the pole piece that it encircles, or by fields of a record track traveling past that gap.

The present invention is directed to a shell type transducer head having the same type of electromagnetic, magnetic circuit, and gap-defining arrangements, but having a specifically different winding and core piece assembly, including gaps so relatively positioned as to permit either one of a pair of record track areas to be individually brought into cooperative relation with a corresponding one of the two gaps, while the other track area is maintained spaced away from both gaps. To provide this arrangement the gaps are spaced apart in directions extended transverse to the record body path, to register respectively with the different track areas, and they are also spaced apart in the general directions of record body travel to permit shiftable guide means to be selectively moved between two positions wherein respectively they are effective to so guide the record body tape that only one of its track areas is presented to a gap for transducing cooperation with it.

Figures 1, 2, 3, 4, 5, 6:
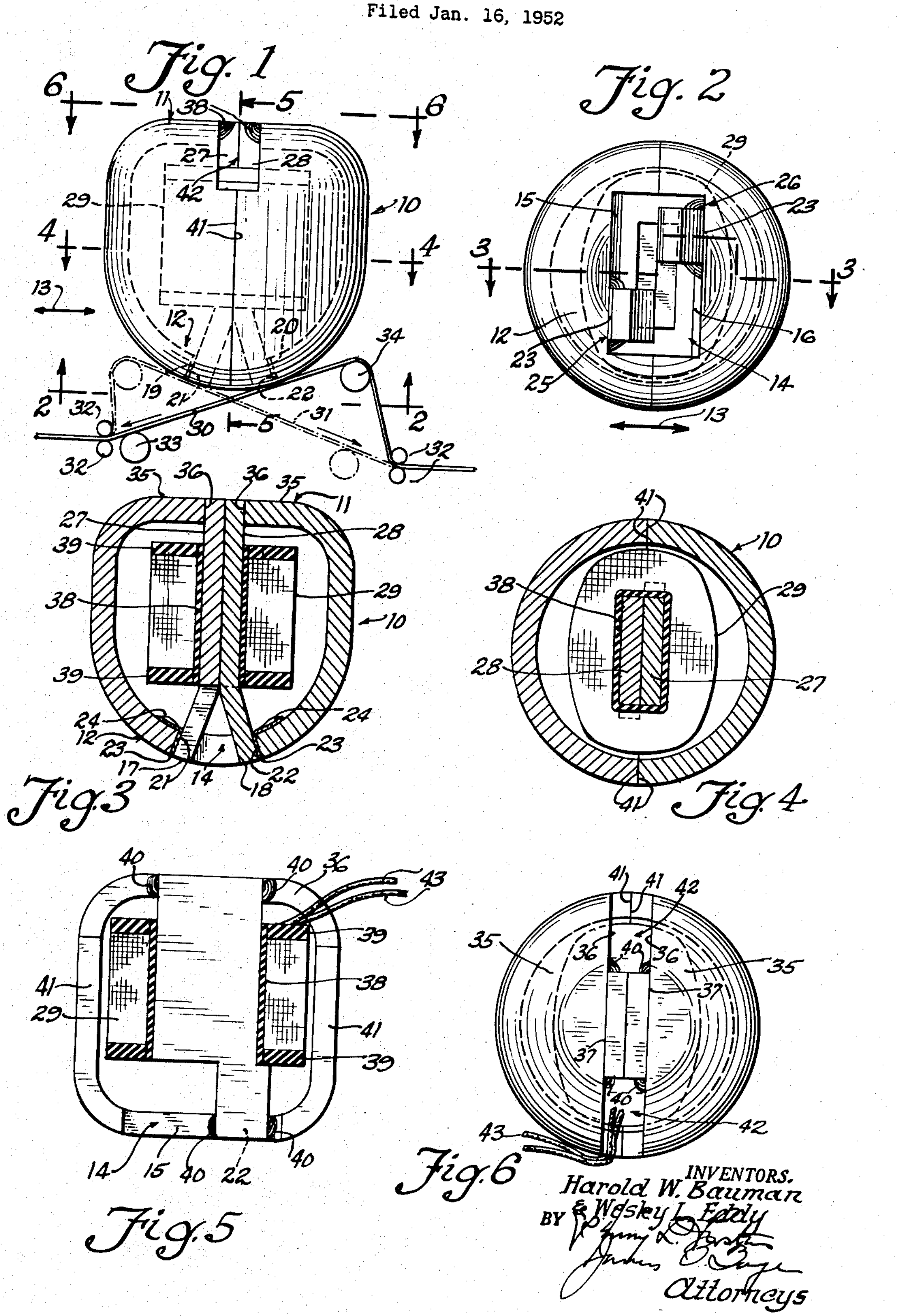
Fig. 1 is a somewhat schematic view, showing in plan a transducer head arranged according to the invention and indicating different paths which a record body may follow in its opposite travel directions, for cooperation in such directions respectively with different transducing gaps of the head.
Fig. 2 is a front end view of the head.
Fig. 3 is a section on line 3—3 of Fig. 2.
Fig. 4 is a section on line 4—4 of Fig. 1.
Fig. 5 is a section on line 5—5 of Fig. 1.
Fig. 6 is a rear end view of the head.

The head comprises a shell having a tubular side wall structure 10, a rear end wall structure 11 and a front end wall structure 12 the outer surface of which provides contact portions for a tape form record body. The front end wall structure 12 is bowed centrally outward in the general directions of the record path past it, such directions being indicated by the arrows 13 in Figs. 1 and 2. Front wall structure 12 is provided with an opening 14 the opposite sides of which are defined by a pair of end wall edges 15, 16 spaced in the general directions of the record path, and preferably which are straight and flat. Edges 15, 16 respectively are spaced in the directions of the record path extent and oppositely from the center plane of the head, and thereby lie in regions of the bowed front wall surface that curve oppositely, laterally and rearwardly in the general directions of record travel. The surfaces of edges 15, 16 preferably are disposed along planes that are substantially normal to the curves of the front wall at the locations of such edges. A pair of pole piece members 17, 18 extend from inside the shell into opening 14, to provide lateral surface portions 19, 20 that respectively overlie and are parallel to portions 21, 22 of the surfaces of the different edges 15, 16. Pole piece surface portions 19, 20 are narrowly spaced from the different edge surface portions 21, 22 that they respectively overlie, at distances corresponding to a selected gap length. Such spacing advantageously is accomplished by bodies 23 of nonmagnetic material interposed between them, and for ease in assembly such bodies may be of strip form having inner portions bent to contact inner shell wall surfaces and adhesively secured to them, as suggested at 24, Fig. 3. The pole piece members are relatively spaced in the directions of the lengths of edges 15, 16 to register with the different track areas of a record body directed laterally over the surface of the shell end structure 13, and their end surfaces have widths in the directions of the lengths of edges 15, 16 corresponding to the widths of such track areas. The gaps 25, 26 defined between the pole piece lateral and shell wall edge surface portions 19, 21 and 20, 22, thereby are of proper width for recording on or reproducing from such track areas. The pole pieces are of small thickness as compared to their widths.

Pole pieces 17, 18 are members of a common core structure, shown as comprising a pair of core pieces 27, 28 that are assembled in face to face, closely contacting registration and from which the different pole pieces respectively project in such formation as to provide the correct spacing and gap widths, and to provide parallelism between the surface portions 19, 20 and the edge portions 21, 22 that they overlie. Core pieces 27, 28 together are encircled by a winding 29.

Selection of the particular gap 25 or 26 with which a record body is to cooperate may be provided for by record guide means movably mounted for shifting between positions wherein respectively they guide the record body to cooperative positional relation to one and the other of the gaps. Typical different record body paths are shown at 30 and 31 in Fig. 1. In each of these paths at the effective gap 25 or 26, the gap-defining surfaces are substantially normal to the record body surface facing the gap. As suggested by Fig. 1, the guide means may comprise a fixed guide device at each side of the head, shown as paired pins 32, and a pair of movably mounted guide devices, such as pins 33, 34, respectively located to opposite sides of the head. Pins 33, 34 are reversely and selectively shiftable between active and inactive positions, pin 34 being shown in the former and pin 33 in the latter in full lines. The pin 33 or 34 that is in the active position, in cooperation with the fixed guide device 32 to the opposite side of the head, guides the record body in the path that places it in cooperative relation with the corresponding transducing gap 25 or 26. The fixed guide devices 32 serve to maintain the record out of cooperation with a gap 25 or 26 when the pin 33 or 34 corresponding to that gap is in its inactive position.

As has been suggested the common core structure of which pole pieces 17, 18 form members here provided by core pieces 27, 28, is secured in close contact with the shell beyond winding 29 from gaps 25, 26. Preferably the contact is accomplished by a closely contacting face-to-edge relation between a rearward lateral surface portion of each core piece 27, 28 with edge surface portions of the shell rear end structure 12. In the specific arrangement shown in the drawings each half shell section has a rear end wall portion 35 that provides a straight, flat edge 36. The different core pieces 27, 28 have flat lateral surface portions 37 that respectively overlie, are parallel to and closely contact the edges 36 of the different shell section rear end walls 35.

In accordance with one aspect of the invention set forth in the above-identified application, the inner turns of winding 29 closely surround and conform to the periphery of the core structure provided by pieces 27, 28, preferably being wound on a thin walled tube 38 that is shaped to closely surround the core structure. The winding is confined at its ends by spool ends 39.

In assembling, the core and pole piece elements 27, 17 and 28, 18 are secured together, the winding mounted on the core structure thus formed, and the shell sections assembled about the winding and core structure. The shell sections are secured together, as by soldering, and the core and pole piece ends are secured in their overlying relation to the shell section end wall edges, as by solder drops 40 placed alongside the core element edges and adhered to them and to the shell walls.

Advantageously the rear end wall edges 36 are inset with relation to side wall edges 41 that preferably are coplanar, and are extended longitudinally beyond a length necessary to provide clearance of the core assembly by the shell section walls. In the assembly this inset and extension of edges 36 provide a slot that accommodates winding lead wires 43.

It will be noted that common magnetic circuit structure is provided by the core pieces 27, 28 and the shell, and different parallel magnetic circuit branches are provided by the respective pole pieces 17, 18 and the different edge surface portions 20, 22 that the pole pieces respectively overlie. The nonmagnetic transducer gaps 25, 26 are thereby made parallel, as distinguished from series gaps provided in transducer heads of the back gap variety heretofore proposed. Due to this parallel relation the gap that is not in cooperating relation presents no reluctance to the magnetic force present in the branch that includes the gap that is in cooperative relation to a record body. In recording, the magnetically permeable material of the record body that extends across the cooperating gap tends to magnetically short circuit the other gap, so that very little magnetic force is drained by the circuit branch that includes the inactive gap. In general, it may be said that the high efficiency of the head arrangement, fully described in the identified patent application, renders it practical to provide a dual, parallel gap head with a single winding for energization of both gaps in recording or for energization by either one alone in reproduction.

We claim:

1. A dual magnetic transducer head comprising a core structure including a central common leg, a pair of pole pieces extended from said common leg, and a magnetic circuit leg structure extended from said core structure at the end of the winding opposite said pole pieces, said leg structure providing a pair of polar surface portions respectively positioned in transducing gap-defining relation to a pair of polar surfaces respectively provided by the different ones of said pole pieces, and a common electrical winding encircling said central common leg, and the gaps defined between the different gap-defining pairs of said surfaces being spaced apart in the directions of both their lengths and widths for respective cooperation with different laterally spaced record body track areas.

2. A dual magnetic transducer head comprising a tubular shell having front and rear end walls and said front end wall having an opening defined between opposite straight and flat edges of said front wall, a core structure extended between said walls, having a portion secured to said rear wall and provided with a pair of pole pieces extended into said opening and said pole pieces respectively having lateral surface portions each of which is disposed parallel to, overlying and facing a portion of a different one of said straight, flat wall edges, and the facing pairs of said surface portions being spaced apart in directions parallel to said edges, for cooperation with different record body track areas, as well as being located at opposite sides of said opening, and said head including a common electrical winding enclosed by said shell and encircling said core structure.

3. A dual magnetic transducer head according to claim 2, wherein said front shell end wall has an outer surface that is transversely bowed convexly in the direction of spacing of said straight, flat edges, said edges being disposed substantially normal to the curve of said bowed wall.

References Cited in the file of this patent

UNITED STATES PATENTS

| Number | Name | Date |
|---|---|---|
| 2,475,421 | Camras | July 5, 1949 |
| 2,523,515 | Porter | Sept. 26, 1950 |